Patented Sept. 28, 1948

2,450,122

UNITED STATES PATENT OFFICE 2,450,122

AMINOALKYL-9,10-DIHYDROANTHRYL KETONES

John W. Cusic, Skokie, Ill., assignor to G. D. Searle & Co., Skokie, Ill., a corporation of Illinois No Drawing. Application July 12, 1946,
Serial No. 683,145

6 Claims. (Cl. 260—293)

This invention relates to the group of aminoketones, derived from 9,10-dihydroanthracene, which is included within the formula

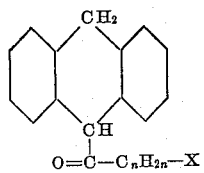

in which $n$ stands for the integer 2, 3, or 4, and the $C_nH_{2n}$ group may be a straight or branched chain group, and in which X represents a monoalkylamino, a dialkylamino, a N-piperidino or a N-morpholino group. These aminoketones are normally obtained as viscous oils or crystalline solids which cannot be distilled even in a vacuum without decomposition. They are practically insoluble in water, but readily soluble in the ordinary organic solvents such as ether, benzene, chloroform, alcohol, etc. They form salts readily with organic and with inorganic acids, most of which salts are readily soluble in water. Most of these salts are first obtained as oily or semi-solid masses, some of which will crystallize on standing under an anhydrous solvent. When once brought into crystalline form they may be further purified by recrystallization from an appropriate anhydrous solvent.

The aminoketones of this invention have been found to possess useful therapeutic properties, particularly as antihistamine and anti-allergic substances. As illustration of the latter properties, a group of guinea pigs may be sensitized to a foreign protein (such as horse serum or egg white), and half of them injected with a dose as low as 1 milligram per kilogram of the hydrochloride of β-dimethylaminoethyl 9,10-dihydroanthryl ketone (the simplest of the compounds of this invention). A dose of the sensitizing protein sufficient to produce fatal anaphylaxis in all of the control animals is administered to the entire group. Among those animals treated with the aminoketone the mortality is reduced to 50% for the dose named above, or even less for larger doses. Such a test provides a dramatic demonstration of the ability of this compound to counteract a severe type of allergic manifestation.

In a somewhat similar manner, the efficacy of these compounds as anti-histamine agents has been demonstrated by injecting them into guinea pigs prior to exposure to a histamine spray of sufficient concentration to cause the death of untreated control animals. Animals injected with a therapeutic dose of one of the aminoketones of this invention are in most instances protected from death, and sometimes show no more than mild symptoms of histamine intoxication.

These therapeutic properties are common both to the free basic ketone and to its salts with acids, though the latter frequently constitute a preferred form because of their water solubility.

The following examples illustrate methods by which these aminoketones may be prepared. The reactions described therein are quite general; all of the compounds of this invention may be obtained by these methods by using appropriate starting materials. These examples are intended to be illustrative only, and are not to be construed as limiting this invention other than as defined in the appended claims.

Example 1

9,10-dihydroanthracene is condensed with β-chloropropionyl chloride according to the method described in the Berichte der Deutschen Chemische Gesellschaft, vol. 72, page 819, the resulting 9-chloropropionyl 9,10-dihydroanthracene being obtained as an undistillable oil. This oil is dissolved in a solution of two molecular equivalents of dimethylamine in toluene, and the mixture heated in a closed vessel at 100° centigrade. After cooling, the solution is extracted with dilute aqueous hydrochloric acid. The acid solution is in turn made alkaline to precipitate the β-dimethylaminoethyl 9,10-dihydroanthryl ketone as an oil. This is best recovered by extraction with ether, drying over sodium sulfate, and removal of the solvent. This base may be converted to a salt by adding to its solution in dry ether an equivalent quantity of the desired acid. Prepared in this way, the hydrochloride is obtained as a gummy mass. On crystallization from a mixture of ether and isopropanol, it separates as an oil which crystallizes on long standing. The purified hydrochloride melts at 177–178° C.

As will be obvious, amines other than dimethylamine can be used in the above example. Thus, use of diethylamine in place of dimethylamine in the above example yields the corresponding β-diethylaminoethyl 9,10-dihydroanthryl ketone, which is obtained as an undistillable oil, and which forms a hydrochloride which could not be brought to crystallization. Similarly, the reaction of piperidine or of morpholine with β-chloropropionyl 9,10-dihydroanthracene leads to the formation of the corresponding piperidinoethyl and morpholinoethyl ketones, respectively. The identity of all of these compounds is apparent not only from their manner of formation but from the results of analyses for their constituent elements.

The applicability of the method illustrated in Example 1 can be further extended by treating the 9,10-dihydroanthracene with halogen-acid chlorides other than the β-chloropropionyl chloride specified, such as α-chloropropionyl chloride or any of the monochlorobutyryl or monochlorovaleryl chlorides. In this way various straight or branched $C_nH_{2n}$ groups may be introduced into the molecule.

The method illustrated in Example 1 can be further extended to the preparation of the monoalkylaminoalkyl ketones contemplated in this invention, by the simple substitution of a monoalkylamine for the amines specified above. Thus, use of three molecular equivalents of monomethylamine in toluene in place of the two equivalents of dimethylamine specified in Example 1 leads to the formation of monomethylaminoethyl 9,10-dihydroanthryl ketone. Similarly, such typical amines as ethylamine, isopropylamine, or n-butylamine, heated in toluene solution with about one third of a molecule of 9-β-chloropropionyl 9,10-dihydroanthracene (or of other chloroacyl derivatives such as the 9-α-chloropropionyl or 9-γ-butyryl 9,10-dihydroanthracenes) lead to the corresponding monoalkylaminoalkyl ketones.

Example 2

9-acetyl 9,10-dihydroanthracene is prepared according to the reference cited in Example 1. 13 grams of dimethylamine hydrochloride and 5.3 gm. of paraformaldehyde are boiled together for a few minutes in a mixture of equal parts of benzene and nitrobenzene, and then 33 gm. of 9-acetyl 9,10-dihydroanthracene are added and the boiling continued for two hours. The benzene (and water formed during the reaction) are removed by distillation, and fresh benzene added and distilled off to complete the removal of water. Addition of dry ether precipitates β-dimethylaminoethyl 9,10-dihydroanthryl ketone hydrochloride as an oily mass which crystallizes on standing. This product is identical in every respect with that prepared according to Example 1.

As in the case of Example 1, the reaction illustrated above is quite general, and by the use of appropriate starting chemicals will lead to a variety of new compounds contemplated in this invention. Thus, other dialkyl amine hydrochlorides or piperidine hydrochloride in place of the dimethylamine hydrochloride specified will lead to the corresponding dialkylaminoethyl or piperidinoethyl ketones.

The substitution of 9-propionyl 9,10-dihydroanthracene for the acetyl compound specified will similarly lead to the formation of various dialkylaminoisopropyl ketones. Thus, the interaction of 20 gm. of piperidine hydrochloride and 5.3 gm. of formaldehyde with 33 gm. of 9-propionyl 9,10-dihydroanthracene according to the directions of Example 2 yields the hydrochloride of β-piperidinoisopropyl 9,10-dihydroanthryl ketone. After purification, the salt is obtained as crystals which melt at 173–175° C. The ketone base may be obtained by addition of sodium carbonate to an aqueous solution of the hydrochloride. It precipitates as a solid, which after crystallization from petroleum ether melts at 121–122° C.

The method illustrated in Example 2 leads less successfully to the preparation of the monoalkylamino ketones contemplated in this invention, since monoalkylamine hydrochlorides generally react less satisfactorily in this type of reaction.

I claim:

1. New compositions of matter useful as therapeutic agents consisting of aminoalkyl 9,10-dihydroanthryl ketones of the formula

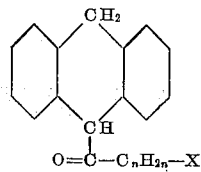

and salts thereof with acids, in which $n$ stands for an integer between 1 and 5, and in which X is chosen from the class consisting of monoalkylamino, dialkylamino, N-piperidino and N-morpholino groups.

2. New compositions of matter useful as therapeutic agents consisting of aminoalkyl 9,10-dihydroanthryl ketones of the formula

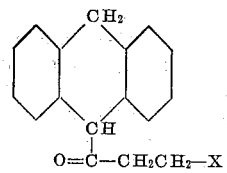

and salts thereof with acids, in which X is chosen from the class consisting of monoalkylamino, dialkylamino, N-piperidino and N-morpholino groups.

3. A new composition of matter useful as a therapeutic agent consisting of dimethylaminoethyl 9,10-dihydroanthryl ketone whose formula is

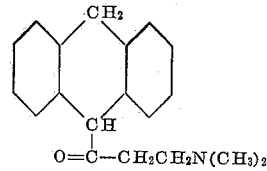

4. A new composition of matter consisting of monomethylaminoethyl 9,10-dihydroanthryl ketone whose formula is

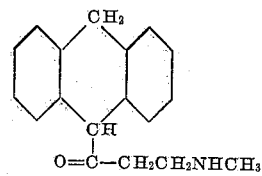

5. New compositions of matter useful as therapeutic agents consisting of aminoalkyl 9,10-dihydroanthryl ketones of the formula

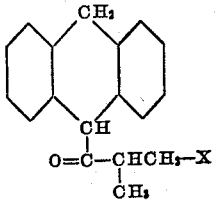

and salts thereof with acids, in which X is chosen from the class consisting of monoalkylamino, dialkylamino, N-piperidino and N-morpholino groups.

6. A new composition of matter useful as a therapeutic agent consisting of piperidinoisopropyl, 9,10-dihydroanthryl ketone whose formula is

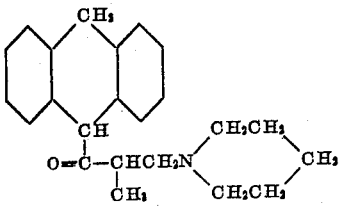

JOHN W. CUSIC.

No references cited.